US005628600A

United States Patent [19]

Pasquini

[11] Patent Number: 5,628,600

[45] Date of Patent: May 13, 1997

[54] KNOB-TYPE CLOSURE DEVICE

[76] Inventor: Paolo Pasquini, Via Rialto 25/B, 40124 Bologna, Italy

[21] Appl. No.: 560,873

[22] Filed: Nov. 20, 1995

[30] Foreign Application Priority Data

Nov. 28, 1994 [IT] Italy ................................ B094A0528

[51] Int. Cl.[6] .................................................. F16B 19/00

[52] U.S. Cl. .......................... 411/354; 411/337; 52/582.1

[58] Field of Search .................................... 411/337, 348, 411/354; 285/316; 52/796.1, 582.1

[56] References Cited

U.S. PATENT DOCUMENTS

| | | | |
|---|---|---|---|
| 2,593,662 | 4/1952 | Dickinson . | |
| 2,816,471 | 12/1957 | Bachman | 411/348 |
| 3,477,333 | 11/1969 | Boyd | 411/348 |
| 3,631,377 | 12/1971 | Bell | 411/348 |
| 4,929,135 | 5/1990 | Delarue | 411/354 |
| 5,205,693 | 4/1993 | Fuller | 411/354 |

FOREIGN PATENT DOCUMENTS

| | | |
|---|---|---|
| 595200 | 9/1925 | France . |

*Primary Examiner*—Flemming Saether
*Attorney, Agent, or Firm*—Guido Modiano; Albert Josif

[57] ABSTRACT

A knob closure device for operating and locking two surfaces which are axially movable with respect to the knob, which comprises: a pin that can be coupled to the first surface and is affected by two annular end grooves; a hollow body that can be coupled to the second surface and supports, so that they can move axially and rotate, the actuation knob on one side and a disengagement cylinder on the other side, the knob and the cylinder being mutually coupled; a central bushing, which is rigidly coupled to the hollow body and in which two oppositely arranged inclined slots are formed that converge toward each other and toward the free end of the bushing; two transverse shafts that are slidingly mounted in the slots and are pushed by a compression spring in tangential engagement in the annular grooves to couple the pin to the bushing; a cam profile that is rigidly coupled to the inlet of the main body, against which a diametrical stem of the knob engages that is adapted to cause the axial sliding of the end of the cylinder to move the shafts into positions that are spaced from the stem and cause their disengagement.

6 Claims, 2 Drawing Sheets

FIG.3
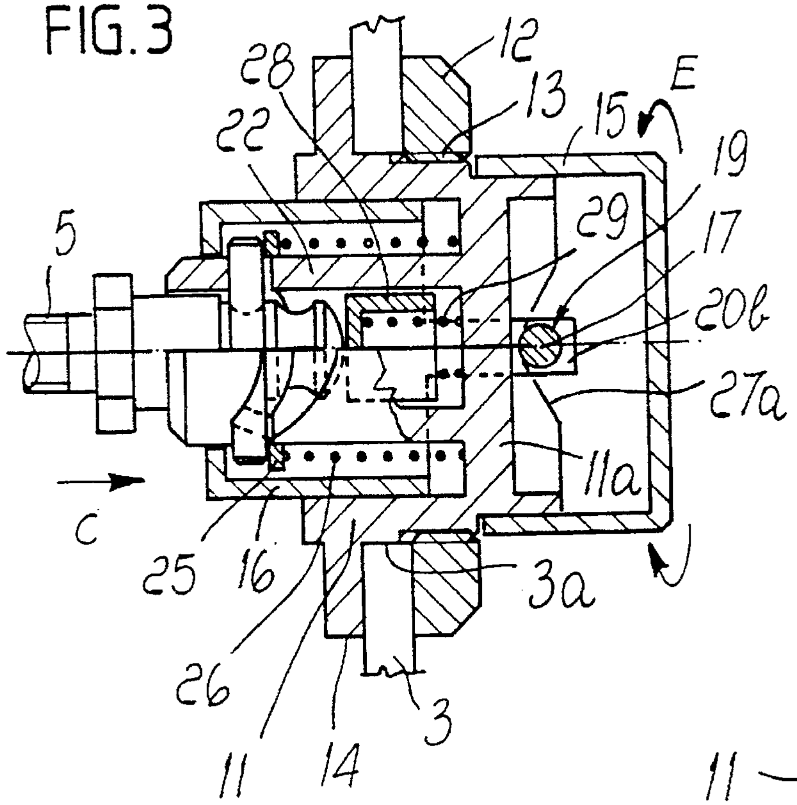
FIG.5
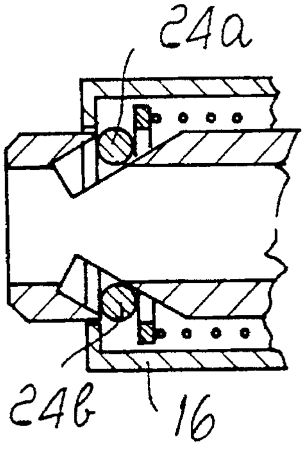
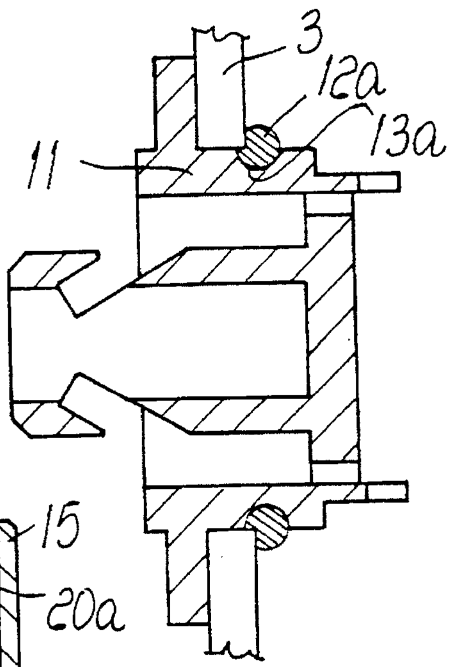
FIG.6
FIG.4
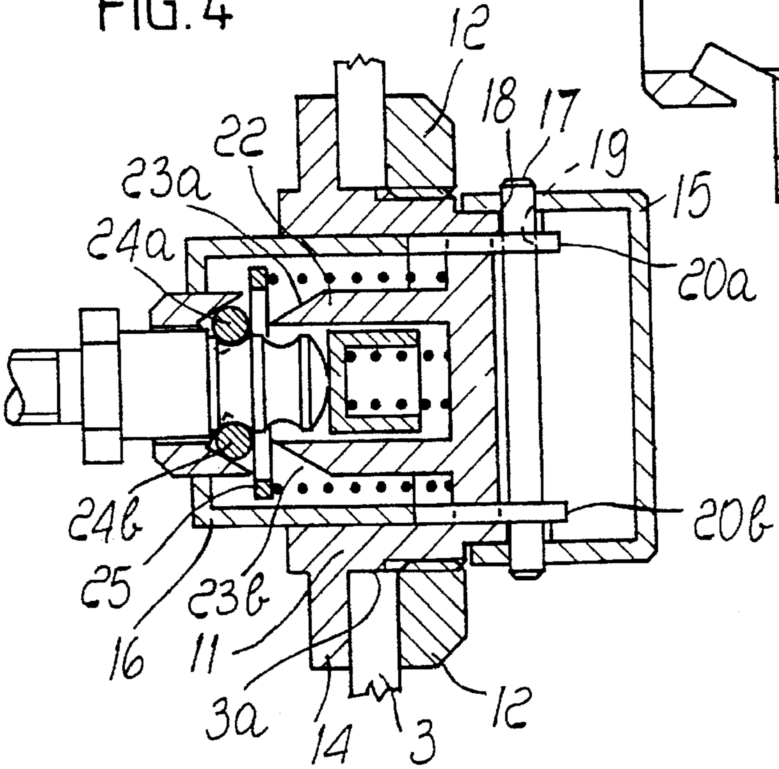

KNOB-TYPE CLOSURE DEVICE

BACKGROUND OF THE INVENTION

The present invention relates to a knob closure device for operating and locking glass panes or doors movable in a direction that is substantially axial with respect to the knob.

The field of closure systems for cabins of farming machines or earth-movers, of closures for hoods or sliding doors, requires compact devices that can be mounted at any angle and allow a certain angular tolerance in alignment between the normals at the surfaces: EEC standards also prescribe, for vehicle doors, a double snap-engagement action, a first snap-engagement action for ajar retention, and a second snap-engagement action for locking in a closed position.

Another desirable characteristic is to be able to release the closure device both by turning and by pulling axially and by acting, on both sides, both on the exposed parts of the knob and on the parts that remain concealed when coupling is performed.

Conventional devices do not effectively meet all the above-mentioned requirements.

SUMMARY OF THE INVENTION

The aim of the present invention is to obviate the drawbacks of conventional devices, i.e., to provide a knob closure device for operating and locking glass panes or doors which are axially movable with respect to the knob that is compact and easy to install, has an acceptable angular tolerance and a double closing snap-engagement action, and allows actuation by rotation and by pulling, with the possibility of acting from the outside or from the inside of the surface to which the knob is applied.

Within the scope of this aim, an object of the present invention is to achieve the above aim with a structure that is simple, relatively easy to manufacture, safe in use, effective in operation, and having relatively low costs.

BRIEF DESCRIPTION OF THE DRAWINGS

Further particularities will become apparent and evident from the detailed description of a preferred but not exclusive knob closure device for operating and locking two surfaces which are axially movable with respect to the knob, according to the invention, illustrated only by way of non-limitative example in the accompanying drawings, wherein:

FIG. 3 is a sectional side view of the device, taken along axis III—III of FIG. 2;

FIG. 4 is a side view, rotated through 90° with respect to FIG. 3, of the device in the engagement condition;

FIG. 5 is a view of a detail of FIG. 4, with the device in disengagement condition;

FIG. 6 is a sectional side view of a detail of the device, provided with a different type of means for fixing the hollow body.

DESCRIPTION OF THE PREFERRED EMBODIMENTS

Figure 2:
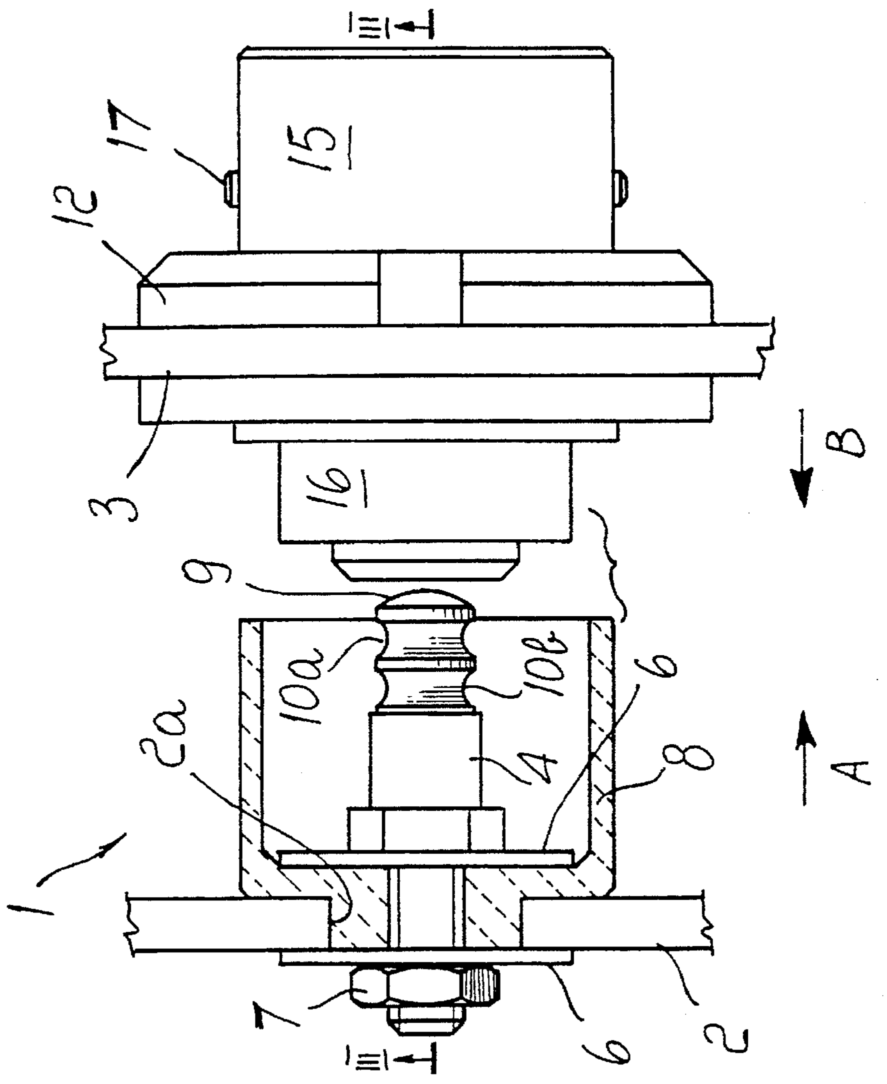
FIG. 2 is a partially sectional side view of the closure device of FIG. 1.
Figure 1:
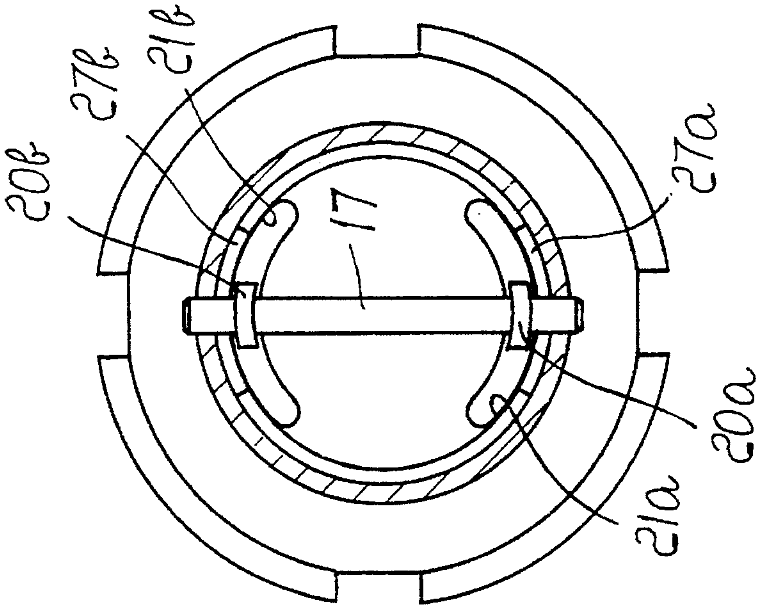
FIG. 1 is a partially sectional front view of the knob closure device, according to the invention.

With particular reference to the above figures, the reference numeral 1 generally designates a knob closure device for operating and locking two surfaces 2 and 3 which are axially movable with respect to each other (arrows A–B); the surfaces 2 and 3 can be of any kind (glass, metal, materials such as plastics, or others) and the only process that must be performed to install the closure device is the formation of respective holes 2*a* and 3*a*.

The device 1 comprises a pin 4 that is provided with means for fixing to the hole 2*a* of the first surface 2; said means are constituted by a threaded stem 5, washers 6, a nut 7, and an optional protective cup 8; the pin 4 has a rounded end 9 and is affected by two annular grooves 10*a* and 10*b* proximate to its engagement end; the cup 8 is made of a material such as rubber, and while its central region allows a certain clearance to the stem 4 to facilitate its coupling, its cylindrical region acts as protection and cushions impacts during closure.

The reference numeral 11 designates a hollow body that is provided with means for fixing in the hole 3*a* of the second surface 3; said means are constituted by a threaded ring 12 that is screwed on a threaded portion 13 of the body 11 and is adapted to secure the edge of the hole against a peripheral annular raised portion 14 of the body 11.

As an alternative, the means for fixing the hollow body can be constituted by a large ring 12*a* of the type known as an O-Ring, which is inserted in a corresponding annular groove 13*a* of the hollow body that is formed at the threaded portion 13: it will be noted that the groove 13*a* is formed advantageously in a position that is slightly shifted toward the raised portion 14, so that the ring 12*a* is forced slightly during insertion so as to deform slightly and maintain a condition of pressure against the edge of the hole 3*a* of the surface 3.

The hollow body 11 supports, so that they can move axially and rotate, a manual actuation knob 15 on one side and a disengagement cylinder 16 on the other side; said knob and said cylinder are coupled by a diametrical stem 17 that passes through two oppositely arranged holes 18 of the knob and two holes 19 of two elongated lugs 20*a* and 20*b* of the cylinder that protrude parallel to the axis of said cylinder and pass through oppositely arranged curved slots 21*a* and 21*b* of an intermediate wall 11*a* of the hollow body 11.

The hollow body 11 is centrally provided with a bushing 22 that is rigidly coupled thereto; two oppositely arranged and inclined slots 23*a* and 23*b* are formed in said bushing and converge toward each other and toward the free end of said bushing; two transverse shafts 24*a* and 24*b* are slidingly mounted in said slots.

A washer 25 rests against the shafts 24*a* and 24*b*, is centered outside the bushing 22, and is pushed by a compression spring 26 that is arranged between the bottom of the bushing and the washer, so as to push the shafts 24*a* and 24*b* into a configuration for tangential engagement in the annular grooves 10*a* and 10*b* of the pin 4 to couple it to the bushing.

A cam profile 27 is formed on the inlet of the main body, and the stem 17 engages thereto; said stem is adapted to cause, by virtue of the rotation of the knob and the sliding against the cam profile, the axial sliding of the end of the cylinder, in order to move the shafts 24*a* and 24*b* into positions that are spaced from the annular grooves of the pin 4 and cause release thereof.

The profile of the cam 27 is repeated in two diametrical positions a and b of the main body and has symmetrical crests that are substantially shaped like a wide V to cause disengagement when the knob 15 is turned to the right and to the left.

A cap 28 is fitted on the bottom of the hollow body against the biasing action of elastic means that are constituted by a helical compression spring 29: the cap 28 is adapted to push in the direction for expulsion, arrow B, the end of the pin 4 that is inserted in the body.

The disengagement of the shafts 24*a* and 24*b* from the annular grooves 10 occurs in relation to relative motions of the cylinder 16 with respect to the hollow body 11 in the direction of the arrows C: these relative movements can be provided by rotating the knob 15 to the right or to the left, arrows E and F (by virtue of the V-shaped profiles of the cams 27), and by pulling the knob, again in the direction of the arrows C, with respect to the hollow body, and by acting on the end of the cylinder 16 (in the direction of the arrows C): in practice it is also possible to act for disengagement with elements that are associated with the surface 2; this possibility is particularly advantageous when one wishes to open the door both by means of the knob associated with the surface 3 and by means of an electromagnetic or lever-operated control associated with the surface 2.

It is noted that for large-size doors it is possible to install two or more knobs and to act on them for release with a single mechanical control.

The double groove 10*a* and 10*b* provides the double closure snap-engagement action (10*a* provides the ajar snap-engagement action, 10*b* provides it for actual closure); it is noted that once the shafts 24*a* and 24*b* have engaged in the grooves 10*a* or 10*b*, a force that tends to move the pin away from the body 11 tends to make the shafts enter the grooves and thus tends to increase the force of the coupling between the parts.

The closure device according to the invention can be installed in any angular position with respect to the surfaces 2 and 3 and has a considerable angular tolerance; in practice, it is sufficient for the rounded end 9 of the pin 4 to be centered in the inlet of the cylinder 16 to ensure correct subsequent engagement of the pin in the first groove 10*a* and in the second groove 10*b*; the coupling is also facilitated by the deformation of the cup 8.

It is thus evident that the invention achieves the intended aim and object.

The invention thus conceived is susceptible of numerous modifications and variations, all of which are within the scope of the inventive concept.

Furthermore, all the details may be replaced with other technically equivalent ones.

In practice, the materials employed, as well as the shapes and dimensions, may be any according to the requirements without thereby abandoning the scope of the protection of the appended claims.

What is claimed is:

1. A knob closure device for operating and locking two surfaces which are axially movable with respect to each other, comprising:

a pin provided with means for fixing in a hole of the first surface and with two annular end grooves;

a hollow body provided with means for fixing in a hole defined in said second surface, said hollow body supporting, on one side thereof, an actuation knob, and on the other side thereof, a disengagement cyilinder so that said knob and said cylinder can move axially and rotate, said knob and said cylinder being coupled;

a central bushing, which is rigidly coupled to said hollow body and in which two oppositely arranged inclined slots are formed; said slots converging towards each other and towards the free end of the bushing;

two transverse shafts that are slidingly mounted in said slots and are pushed by a compression spring arranged between the bottom of the bushing and a washer which rests on the shafts, in a configuration for tangential engagement in said annular grooves to couple the pin to the bushing;

a cam profile rigidly coupled to the inlet of the hollow body, against which a diametrical stem of the knob engages, said stem being adapted to cause, by virtue of the rotation of the knob and the sliding against the cam profile, the axial sliding of the end of the cylinder move said shafts into positions spaced from said stem and cause the disengagements of said shafts;

a cap mounted, in contrast with elastic means, on the bottom of said hollow body and adapted to push, in the direction for expulsion, the end of said pin that is inserted in said body.

2. A device according to claim 1, wherein said means for fixing of said hollow body are constituted by a threaded ring for securing the edge of the hole defined in the second surface against a peripheral annular raised portion of said hollow body.

3. A device according to claim 1, wherein said means for fixing of said hollow body are constituted by ring insertable in an annular groove defined on the hollow body.

4. A device according to claim 3, wherein said ring is a O-Ring.

5. A device according to claim 1, wherein said cam profile is repeated in two diametrical positions of said hollow body and has symmetrical crests that are V-shaped to cause disengagement upon rotation of the knob both to the right and to the left.

6. A device according to claim 1, wherein said diametrical stem of the knob is adapted to couple the knob and the disengagement cylinder by means of two elongated lugs of the barrel that pass through oppositely arranged curved slots of an intermediate wall of the hollow body and have, at their ends, holes through which said stem passes.

* * * * *